US009598015B1

United States Patent
Pertsel et al.

(10) Patent No.: US 9,598,015 B1
(45) Date of Patent: Mar. 21, 2017

(54) AUTOMATIC MIRROR ADJUSTMENT USING AN IN-CAR CAMERA SYSTEM

(71) Applicant: Ambarella, Inc., Santa Clara, CA (US)

(72) Inventors: Shimon Pertsel, Mountain View, CA (US); Alexander Fink, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 14/639,479

(22) Filed: Mar. 5, 2015

(51) Int. Cl.
*B60R 11/04* (2006.01)
*B60R 16/037* (2006.01)
*B60R 1/00* (2006.01)

(52) U.S. Cl.
CPC ........ *B60R 1/006* (2013.01); *B60R 2300/802* (2013.01)

(58) Field of Classification Search
CPC ............. B60R 11/04; B60R 2001/1253; B60R 16/037; B60R 1/006; B60R 21/01538; B60R 25/255; B60R 1/02; B60R 1/074; B60R 1/081; B60R 1/10; B60R 2300/802; B60R 2300/8026; B60R 2300/8046
USPC ............. 701/49; 359/843, 877; 307/10.1, 10
See application file for complete search history.

(56) References Cited

U.S. PATENT DOCUMENTS

| 5,668,675 A * | 9/1997 | Fredricks | B60R 1/02 359/838 |
| 5,706,144 A * | 1/1998 | Brandin | B60R 1/07 307/10.1 |
| 7,354,166 B2 * | 4/2008 | Qualich | B60R 1/025 307/10.1 |
| 2002/0003571 A1 * | 1/2002 | Schofield | B60C 23/00 348/148 |

OTHER PUBLICATIONS

Rho, K.H., et al., "Automatic Mirror Adjustment System Using a Driver's Pupils", Depart of Industrial Systems and Information Engineering Korea University, pp. 251-258, Jun. 2002.

* cited by examiner

*Primary Examiner* — Nga X Nguyen
(74) *Attorney, Agent, or Firm* — Christopher P. Maiorana, PC

(57) ABSTRACT

An apparatus comprising a sensor, an interface and a processor. The sensor may be configured to generate a video signal based on a targeted view of a driver. The interface may be configured to receive status information about one or more components of a vehicle. The processor may be configured to generate a control signal in response to a determined field of view of the driver. The control signal may be used to adjust one or more mirrors of the vehicle. The field of view may be determined based on (i) the video signal and (ii) the status information.

19 Claims, 7 Drawing Sheets

AUTOMATIC MIRROR ADJUSTMENT USING AN IN-CAR CAMERA SYSTEM

FIELD OF THE INVENTION

The present invention relates to video capture devices generally and, more particularly, to an automatic mirror adjustment using an in-car camera system.

BACKGROUND OF THE INVENTION

Blind zones, or blind spots, in a vehicle are a leading cause of accidents between vehicles. A driver checking rear or side view mirrors that are not in correct alignment before changing lanes assumes, often incorrectly, that because there is no vehicle visible in the mirror that a lane change can safely be performed. However, a blind zone due to incorrect alignment of vehicle mirrors may cause nearby vehicles to be out of the field of view of the driver.

Correct alignment of the rear or side view mirrors based on a seating position, height, and distance from the mirrors of the driver could reduce accidents due to blind zones by a significant factor. Nevertheless, studies show that a majority of drivers do not know how to align mirrors correctly. Furthermore, when drivers use vehicles that are not their own, or use a shared vehicle, drivers often find the process of manual mirror adjustment of vehicle mirrors to be too bothersome for a single trip.

Many vehicles are being equipped with in-car camera systems that monitor attentiveness and drowsiness of the driver. Using camera systems to determine blind spots and to adjust vehicle mirrors may significantly increase driver safety.

It would be desirable to implement an automatic mirror adjustment using an in-car camera system.

SUMMARY OF THE INVENTION

The present invention concerns an apparatus comprising a sensor, an interface and a processor. The sensor may be configured to generate a video signal based on a targeted view of a driver. The interface maybe configured to receive status information about one or more components of a vehicle. The processor may be configured to generate a control signal in response to a determined field of view of the driver. The control signal may be used to adjust one or more mirrors of the vehicle. The field of view may be determined based on (i) the video signal and (ii) the status information.

The objects, features and advantages of the present invention include providing automatic mirror adjustment that may (i) determine a field of view of a driver, (ii) adjust vehicle mirrors based on characteristics of each driver, (iii) reduce blind zones, (iv) estimate a location of eyes of a driver, (v) estimate a distance of a driver from a camera based on objects of known size, (vi) adjust vehicle mirrors based on characteristics of a vehicle, (vii) be implemented using existing in-car cameras, (viii) warn a user that mirrors are out of alignment, (ix) provide manual fine-tuning for mirror adjustment along with automatic adjustment, (x) be activated manually, (xi) continually evaluate mirror alignment and/or (xii) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
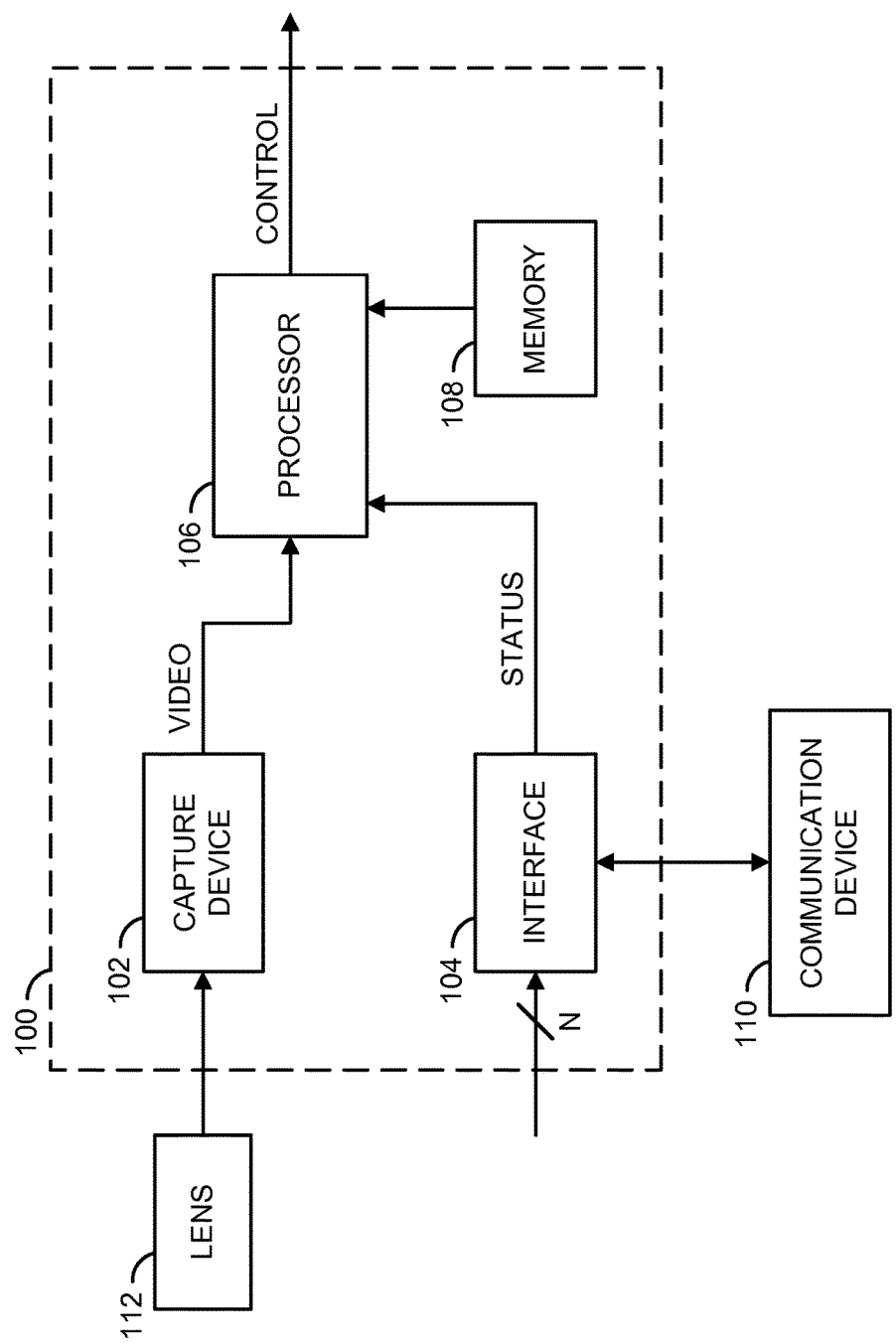
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, a block (or circuit) 104, a block (or circuit) 106, and a block (or circuit) 108. The circuit 102 may implement a capture device. The circuit 104 may implement an interface. The circuit 106 may be configured as a processor. The circuit 108 may be configured as a memory. The camera system 100 is shown connected to a block (or circuit) 110. The circuit 110 may be an external communication device. In some embodiments, the communication device 110 may be implemented as part of the camera system 100. The camera system 100 is shown receiving input from a block (or circuit) 112. The block 112 may be a lens (e.g., a camera lens). In some embodiments, the lens 112 may be implemented as part of the camera system 100. In some embodiments, the camera system 100 may be implemented as a drop-in solution (e.g., installed as one component).

The capture device 102 may present a signal (e.g., VIDEO) to the processor 106. The interface 104 may present a signal (e.g., STATUS) to the processor 106. The processor 106 may be configured to receive the signal VIDEO and/or the signal STATUS. The processor 106 may be configured to generate a signal (e.g., CONTROL). The inputs, outputs and/or arrangement of the components of the camera system 100 may be varied according to the design criteria of a particular implementation.

Figure 2:
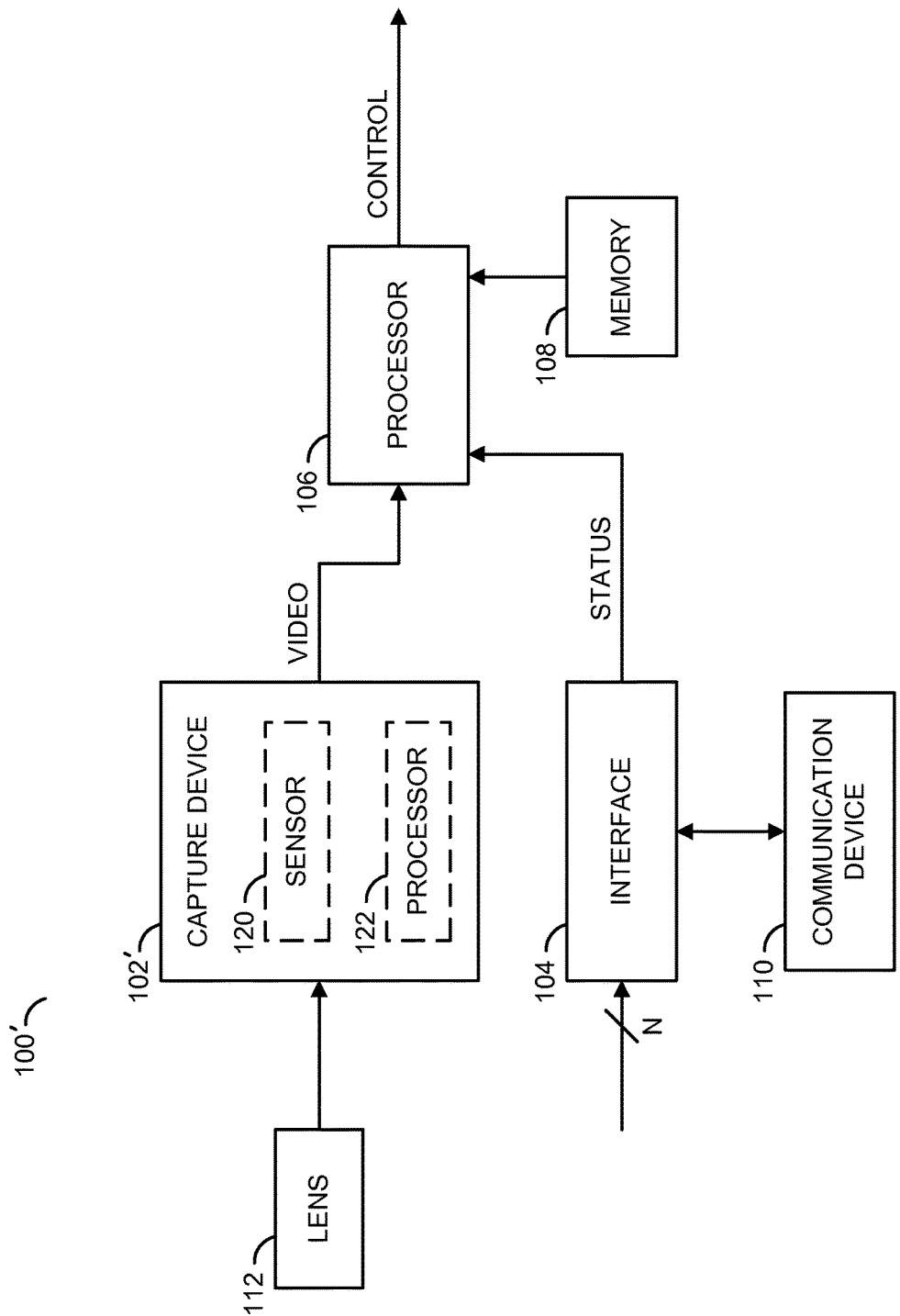
FIG. 2 is a block diagram of another example embodiment of an apparatus.

Referring to FIG. 2, a block diagram of an apparatus 100' is shown in accordance with an embodiment of the present invention. The camera system 100' may comprise the capture device 102', the interface 104, the processor 106, the memory 108, the communication device 110 and/or the lens 112. The camera system 100' may be a distributed system (e.g., each component may be implemented separately throughout the vehicle 50). The capture device 102' may comprise a block (or circuit) 120 and/or a block (or circuit) 122. The circuit 120 may be a sensor. The circuit 122 may be a processor (e.g., a processor separate from the processor 106). The capture device 102' may implement a separate memory.

Figure 3:
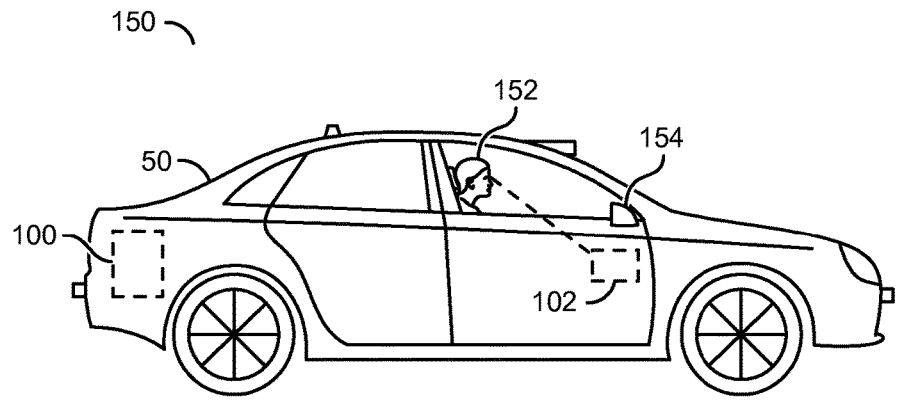
FIG. 3 is a diagram illustrating a capture device detecting a driver of an automobile.

Referring to FIG. 3, an embodiment 150 illustrating the capture device 102 detecting the driver of an automobile/vehicle 50 is shown. The camera system 100 is shown inside the vehicle 50. The capture device 102 is shown inside the vehicle 50. A driver 152 is shown seated in the vehicle 50. A side view mirror 154 is shown attached to the vehicle 50.

The camera system 100 is shown in the rear of the vehicle 50. A location of the camera system 100 may be varied according to the design criteria of a particular implementation. For example, in some embodiments, the vehicle 50 may allow for installation of the camera system 100 in a rear end of the vehicle 50. In other embodiments, the vehicle 50 may allow for installation of the camera system 100 in a front end of the vehicle 50. For example, the camera system 100 may be installed near and/or with the capture device 102 (e.g., in a dashboard of the vehicle 50). In another example, the camera system 100 may be distributed throughout the vehicle 50 (e.g., connections may be implemented between the camera system 100 and the capture device 102 such as a direct wired connection and/or a connection using a common bus line).

Generally, a position of the side view mirror 154 is adjustable using manual controls in the vehicle 50 available to the driver 152 (e.g., buttons on a panel on the inside of the door beside the driver 152, buttons on a center console, an interface on a touchscreen, buttons on a steering wheel, etc.). The camera system 100 may adjust the position/orientation of the side view mirror 154 automatically based on a field of view of the driver 152 determined by the processor 100. In some embodiments, the camera system 100 may adjust the position/orientation of the side view mirror 154 and the driver 152 may make further adjustments and/or fine-tune the positioning of the mirror 154 using the manual controls.

The capture device 102 is shown detecting the driver 152. The capture device 102 may also detect other objects in the vehicle (e.g., a seat, a head rest, an arm rest, a rear window, a seatbelt, a center console, etc.). Based on the detected driver 152, the processor 106 may determine a position (e.g., a distance) of the driver 152 and/or a field of view of the driver 152.

Figure 4:
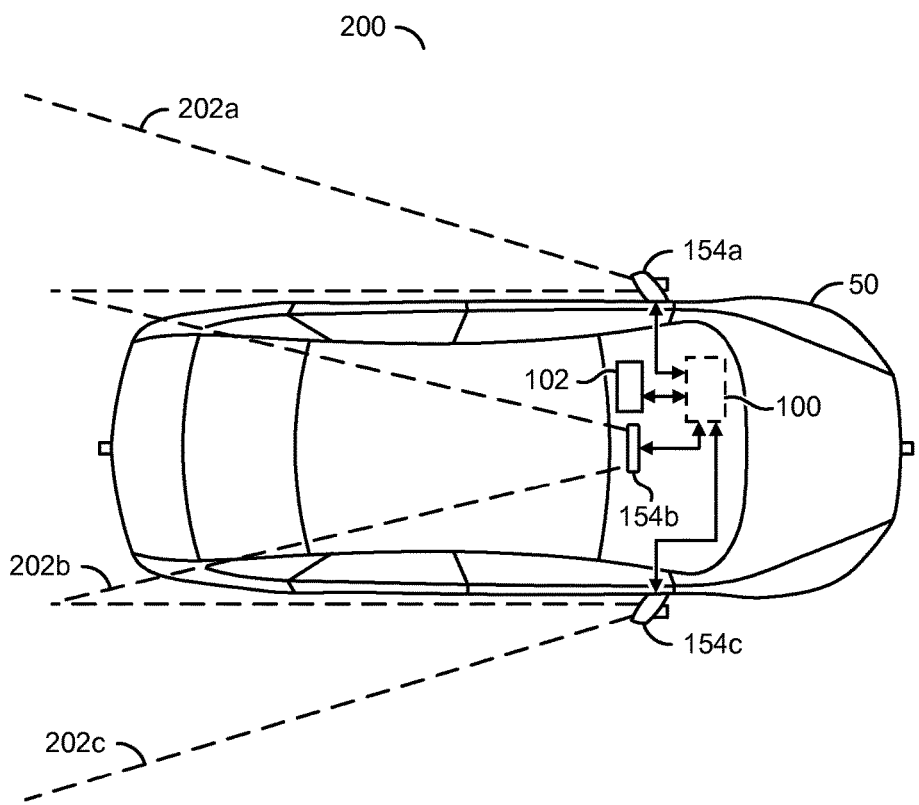
FIG. 4 is a diagram illustrating determined fields of view.

Referring to FIG. 4, an embodiment 200 illustrating determined fields of view is shown. The vehicle 50 is shown having mirrors 154a-154c. The mirror 154a may be a side view mirror on the driver side of the vehicle 50. The mirror 154b may be a rear view mirror of the vehicle 50. The mirror 154c may be a side view mirror on the passenger side of the vehicle 50. The number and/or types of the mirrors 154a-154c may be varied according to the design criteria of a particular implementation.

Fields of view (e.g., FOVs) 202a-202c are shown. The FOVs 202a-202c may be determined by the processor 106. The FOVs 202a-202c may correspond with the mirrors 154a-154c. The FOV 202a is shown with respect to the side view mirror 154a. The FOV 202b is shown with respect to the rear view mirror 154b. The FOV 202c is shown with respect to the side view mirror 154c. The FOVs 202a-202c may be determined based on a position of the driver 152, the orientation of the mirrors 154a-154c and/or the characteristics of the vehicle 50.

Each of the FOVs 202a-202c may represent a range of view when the driver 152 looks at a corresponding one of the mirrors 154a-154c. Generally, the FOVs 202a-202c provide a view behind and/or beside the vehicle 50. The FOVs 202a-202c may be arranged such that blind spots and/or blind zones are eliminated, reduced and/or minimized. Arranging the FOVs 202a-202c to reduce blind spots/zones may improve safety when changing lanes.

Each of the mirrors 154a-154c is shown connected to the camera system 100. The capture device 102 is shown connected to the camera system 100. The mirrors 154a-154c may send status information to the camera system 100 (e.g., to the interface 104). The camera system 100 may send the signal CONTROL to each of the mirrors 154a-154c to adjust the positioning and/or orientation.

The camera system 100 may be implemented to calculate positioning/orientation of the mirrors 154a-154c for the vehicle 50 (e.g., a car, a truck, a motorcycle and/or any type of automobile). The calculated positioning/orientation of the mirrors 154a-154c may be based on the FOVs 202a-202c of the driver 152 of the vehicle 50. The camera system 100 may determine the corresponding FOVs 202a-202c for each of the mirrors 154a-154c of the vehicle 50. A number of FOVs 202a-202c may be determined (e.g., one for each of the mirrors 154a-154c of the vehicle 50). For example, the vehicle 50 may have three mirrors (e.g., the two side view mirrors 154a and 154c and the rear view mirror 154b) and there may be three corresponding FOVs 202a-202c determined by the camera system 100. The camera system 100 may interface with other systems of the automobile 50 to align each of the mirrors 154a-154c (e.g., each mirror may be aligned independently) automatically for each driver. The mirrors 154a-154c may be positioned to reduce and/or eliminate blind spots and/or blind zones of the driver 152. For example, the positioning of the mirrors 154a-154c may be calculated based on characteristics of the driver 152 (height, preferences, etc.) and/or characteristics of the vehicle 50 (size, obstructions, visible zones, etc.).

In some embodiments, the camera system 100 may be installed in the vehicle 50 at a time of manufacturing. For example, the camera system 100 may be installed on a particular type (e.g., model, make, year, etc.) of vehicle 50 and the camera system 100 may store pre-determined status information about the vehicle 50 (e.g., a size, seat positioning, range of view of the mirrors, known sizes of particular objects, etc.).

In some embodiments, the camera system 100 may be installed in the vehicle 50 as a separate component (e.g., an after-market part). In one example, the camera system 100 may be designed and/or sold for a particular make/model of the vehicle 50 and store pre-determined status information (e.g., in the memory 108). In another example, the camera system 100 may be programmable and the status information may be entered in the camera system 100 based on the status information of the vehicle 50. For example, an online database may be implemented with status information for various types of vehicles (e.g., make, model, year, etc.) and the status information may be downloaded and stored in the camera system 100. The implementation of the camera system 100 in the vehicle 50 and/or a method of storing information about the vehicle 50 may be varied according to the design criteria of a particular implementation.

The capture device 102 may capture video image data (e.g., from the lens 112). In some embodiments, the capture device 102 may be a video capturing device such as a camera. In some embodiments, the capture device 102 may be a component of a camera (e.g., a camera pre-installed in the vehicle 50). The capture device 102 may capture data received through the lens 112 to generate a bitstream (e.g., generate video frames). For example, the capture device 102 may receive light from the lens 112. The lens 112 may be directed at the driver 152 to provide a targeted view of the driver 152. The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the driver 152 may be represented as the signal/bitstream/data VIDEO (e.g., a digital video signal). The capture device 102 may present the signal VIDEO to the processor 106. The signal VIDEO may represent the video frames/video data. The signal VIDEO may be a video stream captured by the capture device 102. In some embodiments, the capture device 102 may be implemented in the camera. In some embodiments, the capture device 102 may be configured to add to existing functionality of the camera.

The capture device 102 may be installed in the vehicle 50 (e.g., in the interior of the car 50 directed at the driver 152). In some embodiments, the capture device 152 may be pre-installed in the vehicle 50 and the camera system 100 may connect to the capture device 102. In other embodiments, the capture device 102 may be part of the camera system 100. The capture device 102 may be configured for driver monitoring. For example, the capture device 102 may be implemented to detect drowsiness and/or attentiveness of the driver 152. In another example, the capture device 152 may record the driver 152, (e.g., for use in teleconferencing). The capture device 102 may be configured to recognize the driver 152 through facial recognition. The camera system 100 may be configured to leverage pre-existing functionality of the pre-installed capture device 102. The implementation of the capture device 102 may be varied according to the design criteria of a particular implementation.

In some embodiments, the capture device 102' may implement the sensor 120 and/or the processor 122. The sensor 120 may receive light from the lens 112 and transform the light into digital data (e.g., the bitstream). For example, the sensor 120 may perform a photoelectric conversion of the light from the lens 112. The processor 122 may transform the bitstream into a human-legible content (e.g., video data). For example, the processor 122 may receive pure (e.g., raw) data from the sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the eyes of the driver 152. For example, the processor 122 may analyze the captured bitstream (e.g., using machine vision processing), determine a location of the eyes of the driver 152 and present the signal VIDEO (e.g., comprising information about the location of the eyes of the driver 152) to the processor 106. The processor 122 may be configured to determine the location of the eyes of the driver 152 (e.g., less analysis is performed by the processor 106). In another example, the processor 122 may generate the signal VIDEO comprising video frames and the processor 106 may analyze the video frames to determine the location of the eyes of the driver (e.g., more analysis is performed by the processor 106). The analysis performed by the processor 122 and/or the processor 106 may be varied according to the design criteria of a particular implementation.

The interface 104 may receive data from one or more components of the vehicle 50. The signal STATUS may be generated in response to the data received from the components of the vehicle 50. In some embodiments, the interface 104 may receive data from the processor 106. The interface 104 may send data (e.g., instructions) from the processor 106 to the components of the vehicle 50. The data from the components of the vehicle 50 may be a seat position, a seat recline position, an angle of the bottom seat cushion, a mirror orientation, a speed of the vehicle, any information available from an on-board diagnostics (OBD) port of the vehicle 50, etc. The type of data and/or the number of components of the vehicle 50 that provide data may be varied according to the design criteria of a particular implementation.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the driver 152 in the video frame. In some embodiments, the processor 122 may be configured to detect the driver 152 and the processor 106 may receive the location of the eyes of the driver from the capture device 102'. In some embodiments, the processor 106 may be configured to analyze the video frame (e.g., the signal VIDEO). The processor 106 may be configured to detect a location and/or position of the eyes of the driver in the video frame. The processor 106 may determine a distance of the eyes of the driver from the camera based on information from the signal STATUS. In some embodiments, the processor 106 may receive the location of the eyes from the capture device 102' and distance of the eyes of the driver from the camera through the interface 104. The information received by the processor 106 and/or the analysis performed by the processor 106 may be varied according to the design criteria of a particular implementation.

Based on the distance and/or location of the eyes of the driver and/or the mirrors of the vehicle, the processor 106 may determine the FOVs 202a-202c of the driver 152. The FOVs 202a-202c of the driver 152 may be based on the signal VIDEO and/or the signal STATUS. The processor 106 may generate the signal CONTROL in response to the determined FOVs 202a-202c.

The signal CONTROL may be implemented to provide instructions to the various components of the vehicle 50. For example, the signal CONTROL may be used by the mirrors 154a-154c to adjust an orientation of the mirrors 154a-154c (e.g., based on the determined FOVs 202a-202c). The orientation of the mirrors 154a-154c may be an angle, a location and/or a position (e.g., any characteristic of the mirrors 154a-154c that may affect the FOVs 202a-202c of the driver 152). In some embodiments, the signal CONTROL may be presented to the interface 104 and the interface 104 may pass the signal CONTROL to one of the components of the vehicle 50. In some embodiments, the signal CONTROL may be presented directly to one of the components of the vehicle 50 by the processor 106.

The processor 106 and/or the processor 122 may be implemented as an application specific integrated circuit (e.g., ASIC) or a system-on-a-chip (e.g., SOC). The processor 106 and/or the processor 122 may be configured to determine a current size of an object of known size (e.g., an object having a reference size). The processor 106 and/or the processor 122 may detect an object of known size in each video frame. The processor 106 and/or the processor 122 may determine a number of pixels (e.g., a width and/or a height) comprising the object of known size in the video frame. Based on the number of pixels of the object of known size in the video frame, the processor 106 and/or the processor 122 may estimate a distance of the driver from the lens 112. Whether the detection of the object of known size is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the objects of known size. For example, the memory 108 may store a reference size (e.g., the number of pixels of the object of known size in a video frame at a known distance) of the object of known size. The reference size stored in the memory 108 may be used to compare the current size of the object of known size detected in a current video frame. The comparison of the size of the object of known size in the current video frame and the reference size may be used to estimate a distance of the driver from the lens 112.

The memory 108 may store the pre-determined status information of the vehicle 50. For example, the status information of the vehicle 50 may be updated by overwriting the status information stored in the memory 108. In some embodiments, the memory 108 may store pre-defined preferences (e.g., mirror orientation) for each driver.

The communication device 110 may send and/or receive data to/from the interface 104. In some embodiments, the communication device 110 may be the OBD of the vehicle 50. In some embodiments, the communication device 110 may be implemented as a satellite (e.g., a satellite connection to a proprietary system). For example, the satellite 110 may receive data from one or more vehicles. The data received by the satellite 110 may be used by vehicle manufacturers to improve the driving experience and/or detect problems with vehicles. The data received by the satellite 110 may be used to provide roadside assistance. For example, aggregate data from the communication device 110 may determine behavioral patterns of drivers (e.g., how often drivers check the mirrors, whether drivers change the orientation of the mirrors, attentiveness of drivers, etc.).

The communication device 110 may implement vehicle-to-vehicle communication. In some embodiments, the communication device 110 may implement a wireless and/or cellular communication system (e.g., a 4G LTE connection). In some embodiments, the communication device 110 may provide a connection to a device of the driver 152 (e.g., a Bluetooth connection to a smartphone, a ZigBee connection to a mesh network of interconnected devices, a Wi-fi connection to a tablet computing device, etc.). The implementation of the communication device 110 may be varied according to the design criteria of a particular implementation.

The lens 112 (e.g., a camera lens) may be directed at the driver 152 (e.g., directed at the seat of the driver 152, provide a targeted view of the driver 152, etc.). For example, the lens 112 may be mounted on a dashboard of the vehicle 50. In another example, the lens 112 may be mounted as part of a console of the vehicle 50. The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

Figure 5:
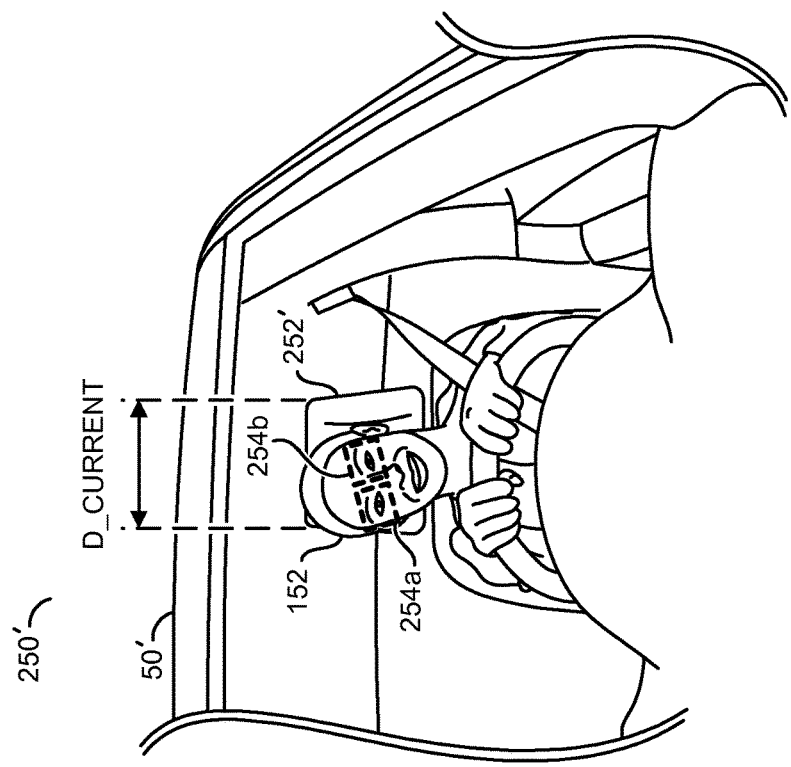
FIG. 5 is a diagram illustrating eye detection and object size comparison.
Figure 5:
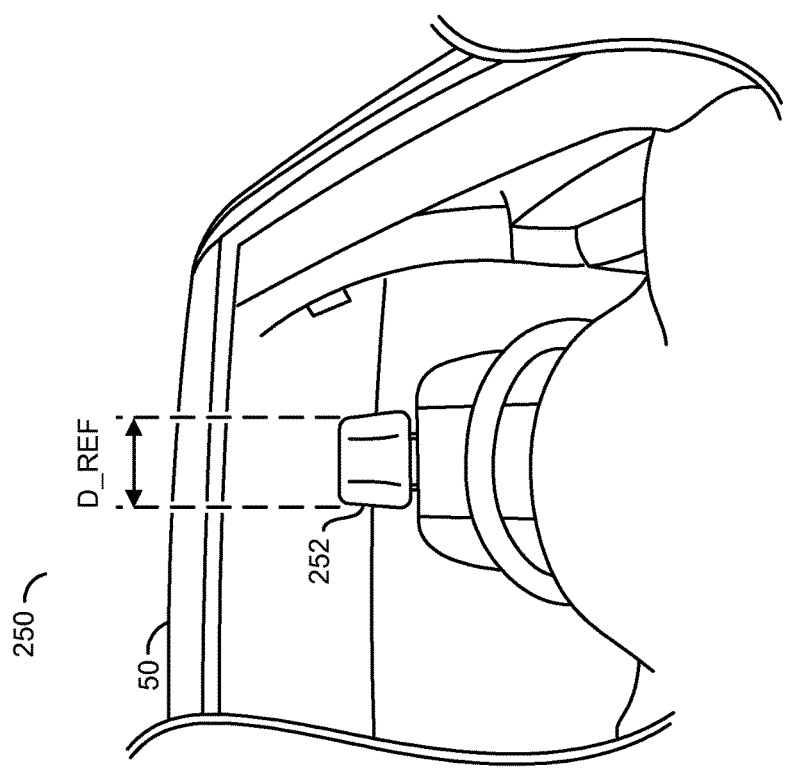

Referring to FIG. 5, video frames 250 and 250' illustrating eye detection and object size comparison are shown. The video frames 250 and 250' may be video frames generated by the capture device 102. The video frames 250 and/or 250' may represent a targeted view captured by the lens 112 mounted on the dashboard of the vehicle 50. The view captured for each of the video frames may be varied according to the design criteria of a particular implementation.

The video frame 250 may represent a reference frame. For example, the reference frame 250 may be stored in the memory 108. The reference frame 250 shows an object of known size 252 in the vehicle 50. The object of known size 252 may be a head rest of the driver side seat. The processor 106 and/or the processor 122 may determine the width of the object of known size 252 (e.g., based on the number of pixels in the video frame). The memory 108 may store the width of the object of known size 252 (e.g., D_REF). The width D_REF may be determined when the object of known size 252 is at a known distance from the lens 112. The width D_REF may be stored in the memory 108 as the reference size.

The video frame 250' may represent a current frame. For example, the capture device 102 may send the signal VIDEO as the current frame to the processor 106. In another example, the processor 122 may generate and/or analyze the current frame 250' (e.g., the current frame 250' may be stored in a memory of the capture device 102') and send a result of the analysis (e.g., the location of the eyes of the driver 152) to the processor 106. The current frame 250' shows the vehicle 50', the driver 152 and an object of known size 252'. The current frame 250' may be analyzed by the processor 106 and/or the processor 122. The processor 106 and/or the processor 122 may detect the eyes of the driver 152. Boxes 254a-254b may represent the detected eyes of the driver 152 in the current frame 250'.

The object of known size 252 and/or 252' may be an object physically connected to the seat of the driver 152. For example, the object of known size 252 and/or 252' may be the head rest as shown. In some embodiments, the object of known size 252 and/or 252' may be the seat of the driver 152, an arm rest of the seat of the driver 152 and/or a seat belt. Other objects in the reference frame 250 and/or the current frame 250' may have a known size (e.g., a steering wheel, a rear seat, a dashboard, a sunroof, a moonroof, etc.) but may be unsuitable for determining a distance of the driver 152 from the lens 112 (e.g., objects that generally have a fixed position in the video frames).

The distance of the driver 152 from the lens 112 may be estimated based on the object of known size 252 and/or 252' and characteristics of the driver 152. For example, if the headrest 252' is determined to be 4.5 feet away from the lens 112 an average sitting posture and head size may be used to estimate that the eyes of the driver 152 may be 3.5 feet from the lens 112. The characteristics of the driver 152 and/or the estimations performed may be varied according to the design criteria of a particular implementation.

The processor 106 and/or the processor 122 may be configured to detect the object of known size 252' in the current frame 250'. The object of known size 252' may be the head rest. The head rest 252' is shown closer in the current frame 250' than the head rest 252 in the reference frame 250. The processor 106 and/or the processor 122 may determine the width of the object of known size 252' (e.g., the number of pixels in the video frame). The memory 108 may store the width of the object of known size 252' (e.g., D_CURRENT). The width D_CURRENT may be used as the current size of the object of known size 252'. The current size D_CURRENT may be compared to the reference size D_REF by the processor 106 and/or the processor 122. Based on the comparison of the current size D_CURRENT and the reference size D_REF, the processor 106 and/or the processor 122 may estimate a distance of the driver 152 from the lens 112.

Using the detected eyes 254a-254b and the estimated distance of the driver 152 from the lens 112, the processor 106 and/or the processor 122 may determine the position (e.g., 3D coordinates and/or location coordinates) of the eyes of the driver 152. For example, the location of the detected eyes 254a-254b may represent one coordinate (e.g., a location coordinate on a first axis) for a vertical location of each eye in 3D space, and one coordinate (e.g., a location coordinate on a second axis) for a horizontal location of each eye in 3D space. The determined distance from the lens 112 may represent one coordinate (e.g., a location coordinate on a third axis) for a depth location of each of the detected eyes 254a-254b in 3D space. For example, the processor 122 may determine the location of the detected eyes 254a-254b in 3D space and transmit the location (e.g., using the signal VIDEO) to the processor 106.

Based on the determined position/location of the eyes of the driver 152 and the orientation of the mirrors 154a-154c (e.g., determined based on the signal STATUS), the processor 106 may determine the FOVs 202a-202c. The processor 106 may determine whether the FOVs 202a-202c should be adjusted to reduce and/or eliminate blind spots and/or blind zones. The processor 106 may generate the signal CONTROL in response to one or more of the determined FOVs 202a-202c. The signal CONTROL may provide instructions for adjusting the mirrors 154a-154c.

Figure 6:
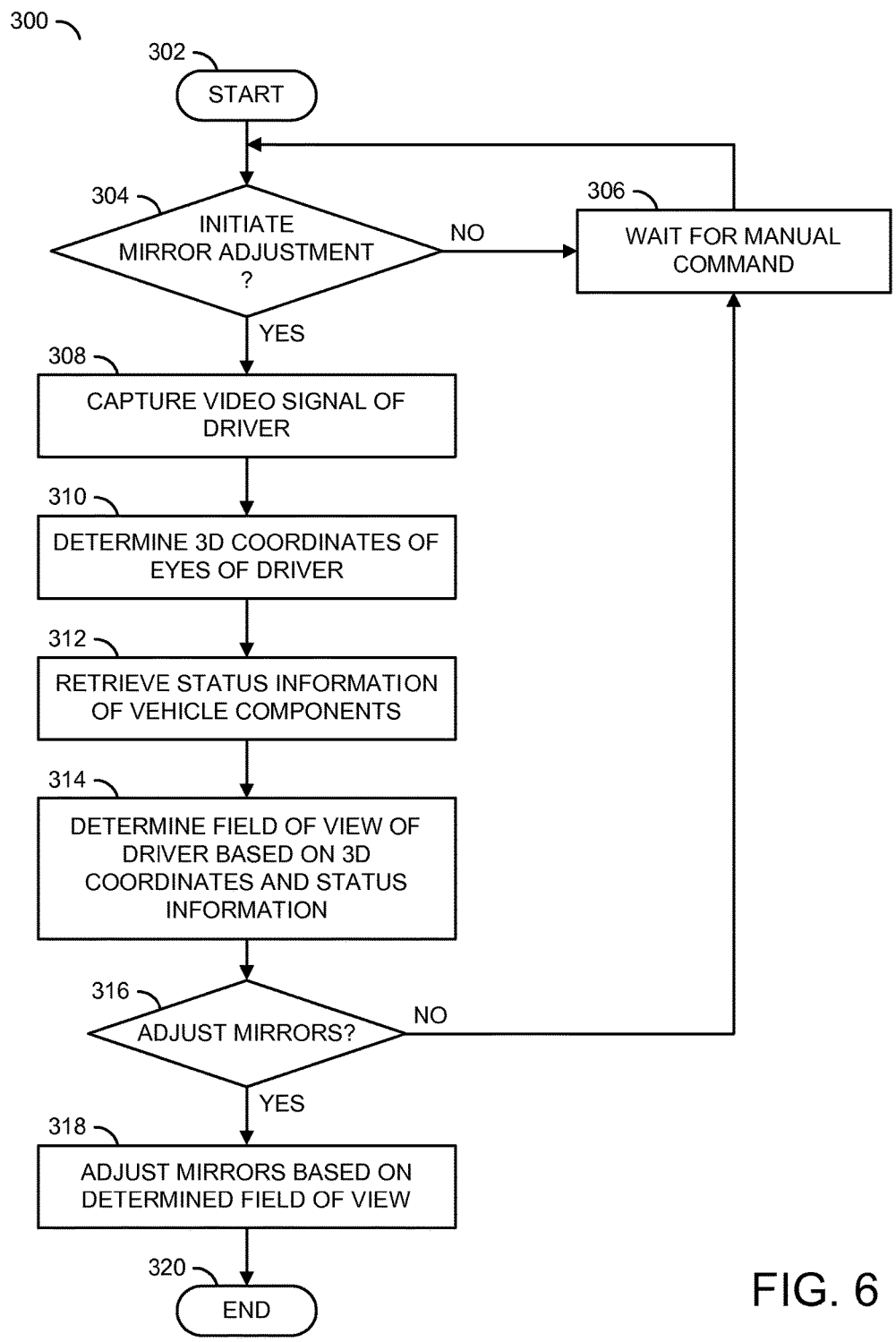
FIG. 6 is a flow diagram illustrating a method for automatic mirror adjustment.

Referring to FIG. 6, a method (or process) 300 is shown. The method 300 may perform automatic mirror adjustment. The method 300 generally comprises a step (or state) 302, a decision step (or state) 304, a step (or state) 306, a step (or state) 308, a step (or state) 310, a step (or state) 312, a step (or state) 314, a decision step (or state) 316, a step (or state) 318, and a step (or state) 320.

The state 302 may start the method 300. Next, the method 300 may move to the decision state 304. If the decision state 304 determines not to initiate a mirror adjustment, the method 300 may move to the state 306. The state 306 may wait for a manual command. Next, the method 300 may return to the decision state 304. If the decision state 304 determines to initiate a mirror adjustment, the method 300 may move to the state 308.

The state 308 may capture a video signal and/or video data (e.g., VIDEO) of the driver 152. Next, the state 310 may determine 3D coordinates of the eyes of the driver 152. The state 312 may retrieve status information (e.g., STATUS) of the vehicle components. The state 314 may determine the field of view (e.g., the FOVs 202a-202c) of the driver 152 based on the 3D coordinates and/or the status information. Next, the method 300 may move to the decision state 316.

If the decision state 316 determines not to adjust the mirrors 154a-154c, the method 300 may move to the state 306. If the decision state 316 determines to adjust the mirrors 154a-154c, the method 300 may move to the state 318. The state 318 may adjust the mirrors 154a-154c (e.g., using the signal CONTROL) based on the determined FOVs 202a-202c. Next, the method 300 may move to the state 320, which ends the method 300.

The camera system 100 may determine a location and/or position of eyes of the driver 152 with respect to the mirrors 154a-154c. For example, the location/position of the eyes may be represented in 3D coordinates. In another example, the location/position of the eyes may be represented as a vector. In yet another example, displacement of the eyes with respect to the mirrors 154a-154c may be determined. The method of determining the distance and/or position of the eyes of the driver 152 may be varied according to the design criteria of a particular implementation. The camera system 100 may determine an orientation of each of the mirrors 154a-154c (e.g., based on the signal STATUS). Based on the orientation of the mirrors 154a-154c and/or the position/location of the eyes of the driver 152 a FOV (e.g., the FOVs 202a-202c) for each eye for each mirror relative to the vehicle 50 may be determined.

The location/position of the eyes of the driver 152 may be determined using a camera (e.g., the lens 112) facing the driver 152. The camera lens 112 may present a signal to the capture device 102. In some embodiments, the capture device 102 may present the signal VIDEO to the processor 106. The processor 106 may determine and/or recognize the eyes of the driver 152. The processor 106 may locate the eyes of the driver 152 in each video frame (e.g., the signal VIDEO). Based on the location of the eyes, the processor 106 may estimate the distance of the eyes of the driver with respect to the camera lens 112. In other embodiments, the capture device 102' may determine and/or recognize the eyes of the driver 152, determine a distance of the eyes of the driver 152 from the camera lens 112 and/or present the signal VIDEO having the 3D coordinates of the location of the eyes of the driver 152 to the processor 106.

A location of the eyes in the video frame alone may not provide enough information to determine the FOVs 202a-202c of the driver 152 and/or a distance from the camera lens 112. In some embodiments, status information may be used to determine the FOVs 202a-202c of the driver 152. For example, a position of a seat (e.g., height, depth, recline, angle of a bottom cushion of the seat, etc.) of the driver 152 may be used to determine the distance of the driver 152. The position of the seat of the driver may be available through the OBD port of the vehicle 50 (e.g., for vehicles with electronic seat adjustment). In another example, the current position of the mirrors 154a-154c may be the status information. The FOVs 202a-202c of the driver 152 may depend on the angle of the mirrors 154a-154c. In yet another example, the amount of recline of the seat may be the status information. The amount of recline may be used to determine an angle of the eyes of the driver 152 with respect to the mirrors 154a-154c (e.g., the rear view mirror 154b may provide a FOV showing the ceiling of the vehicle if the seat of the driver is reclined and the driver is looking upwards at the rear view mirror).

Figure 7:
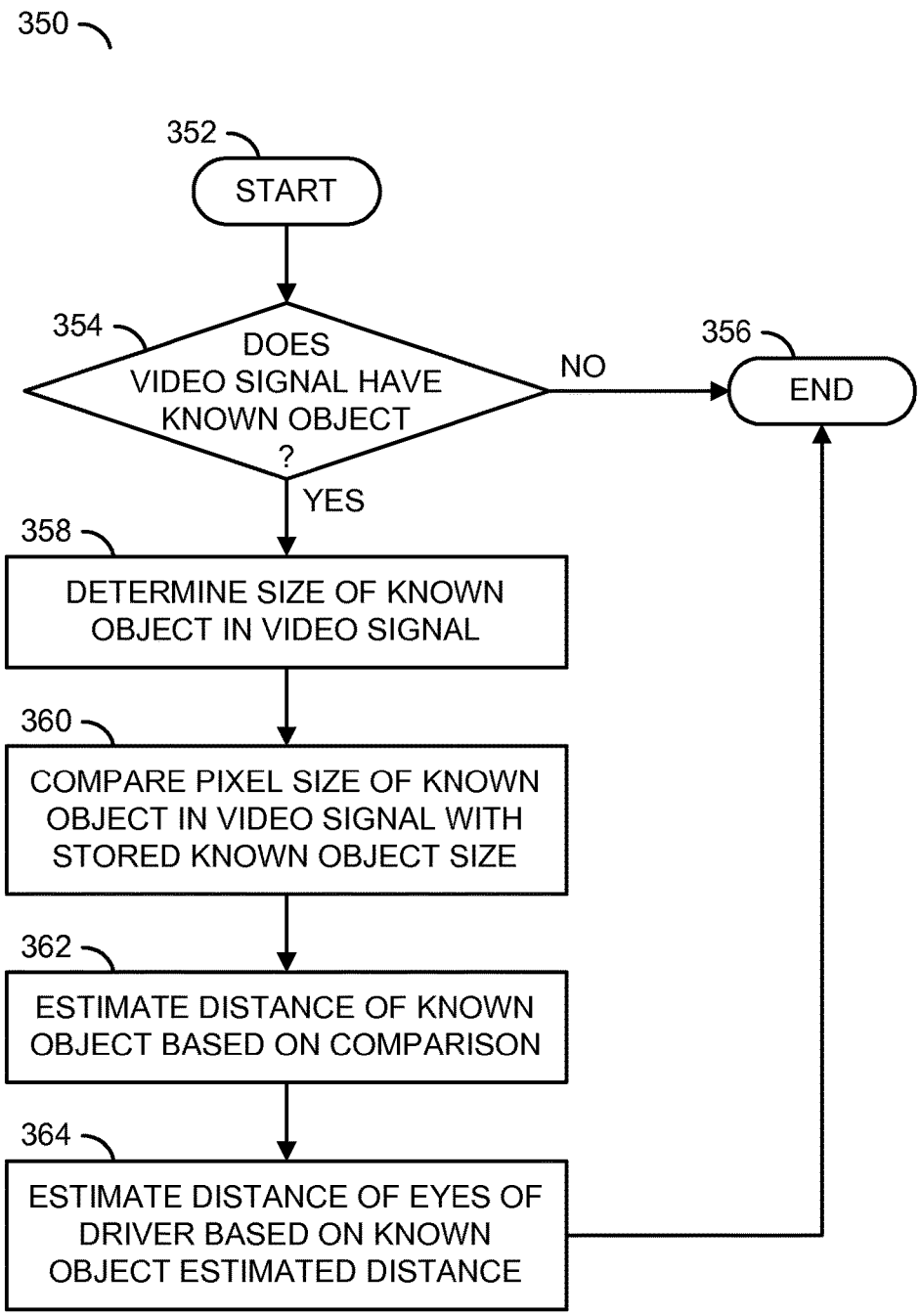
FIG. 7 is a flow diagram illustrating a method for comparing objects of known size to determine distance.

Referring to FIG. 7, a method (or process) 350 is shown. The method 350 may compare objects of known size to determine distance. The method 350 generally comprises a step (or state) 352, a decision step (or state) 354, a step (or state) 356, a step (or state) 358, a step (or state) 360, a step (or state) 362, and a step (or state) 364.

The state 352 may start the method 350. Next, the method 350 may move to the decision state 354. If the decision state 354 determines the video signal does not have a known object (e.g., the head rest, the seat, the arm rest, etc.) in the video frame, the method 350 may move to the state 356. The state 356 may end the method 350. If the decision state 354 determines the video signal does have the known object in the video frame, the method 350 may move to the state 358.

The state 358 may determine the size of the known object from the video signal/frame (e.g., a number of pixels). Next, the state 360 may compare a pixel size of the known object from the video signal/frame (e.g., D_CURRENT) with a stored known object size (e.g., the reference size D_REF stored in the memory 108). The state 362 may estimate the distance (e.g., from the camera lens 112) of the known object based on the comparison. The state 364 may estimate the distance of the eyes of the driver 152 from the camera lens 112 based on the estimated distance of the known object. Next, the method 350 may move to the end state 356.

In some embodiments, a calculation using an object of known size may be performed. For example, an object of known size may be a part of the seat of the driver 152 (e.g., the head rest, the width of the seat at a given height, an arm rest, a seat belt, etc.). The type of object of known size may be varied according to the design criteria of a particular implementation.

Knowing the width of the object, the exact FOV of the driver-facing camera lens 112 and the number of pixels the object occupies in the video frame, the distance and/or position of the eyes of the driver 152 from the camera lens 112 may be calculated. For example, a distance of the seat of the driver 152 from the camera lens 112 may be determined. Based on the distance of the seat, the distance of the eyes of the driver 152 from the camera lens 112 may be calculated (or estimated). For example, the distance of the eyes of the driver 152 from the camera lens 112 may be estimated based on assumptions about typical sitting posture of a driver. In some embodiments, anatomical, ergonomic and/or physiological data may be used to make assumptions about the seating position of the driver 152.

Figure 8:
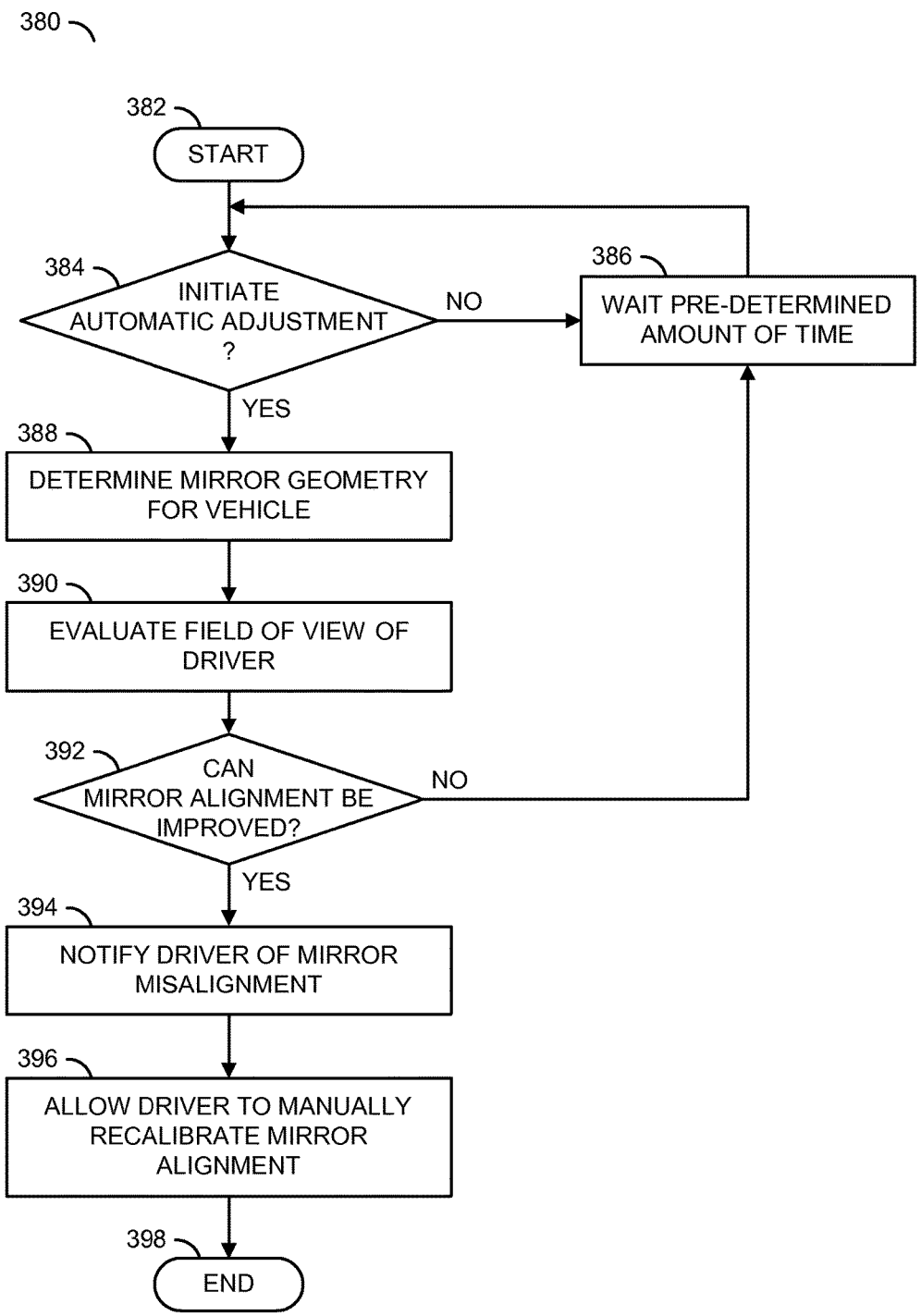
FIG. 8 is a flow diagram illustrating a method for notifying a driver of mirror misalignment.

Referring to FIG. 8, a method (or process) 380 is shown. The method 380 may notify the driver 152 of mirror misalignment. The method 380 generally comprises a step (or state) 382, a decision step (or state) 384, a step (or state) 386, a step (or state) 388, a step (or state) 390, a decision step (or state) 392, a step (or state) 394, a step (or state) 396, and a step (or state) 398.

The state 382 may start the method 380. Next, the method 380 may move to the decision state 384. If the decision state 384 determines not to initiate the automatic adjustment, the method 380 may move to the state 386. The state 386 may wait a pre-determined amount of time. Next, the method 380 may return to the decision state 384. If the decision state 384 determines to initiate the automatic adjustment, the method 380 may move to the state 388.

The state 388 may determine the mirror geometry for the vehicle 50 (e.g., based on the characteristics of the vehicle 50 and/or the status information stored in the memory 108). The state 390 may evaluate the field of view of the driver 152. Next, the method 380 may move to the decision state 392.

If the decision state 392 determines the mirror alignment cannot be improved, the method 380 may move to the state 386. If the decision state 392 determines the mirror alignment can be improved, the method 380 may move to the state 394. The state 394 may notify the driver 152 of the mirror misalignment. The state 396 may allow the driver 152 to manually re-calibrate the mirror alignment. Next, the state 398 may end the method 380.

The camera system 100 may be configured to automatically adjust the mirrors 154a-154c. The automatic adjustment process may be activated through a separate button, option and/or command. The mirrors 154a-154c may be adjusted manually for fine-tuning. In some embodiments, the automatic adjustment process may be used in conjunction with manual adjustment of the mirrors 154a-154c. For example, the automatic adjustment process may adjust the mirrors 154a-154c to a position based on the determined FOVs 202a-202c (e.g., a position considered to be safe for driving) and the driver 152 may then make further adjustments based on individual preferences.

The processor 106 may perform the automatic adjustment continuously, periodically and/or at fixed intervals (e.g., based on a pre-determined amount of time). For example, the processor 106 may evaluate a current alignment of the mirrors 154a-154c. If the alignment is determined to be unsafe (e.g., sub-optimal, the mirror position is determined to be too far off, etc.) the driver 152 may be notified. For example, the driver may be notified by a warning and/or an alert (e.g., an LED indicator, an image blinking, sound, haptic feedback from the seat, etc.). The notification may prompt the driver 152 to adjust the mirror orientation and/or change seat position.

In some embodiments, a notification may indicate that the camera system 100 is automatically making adjustments to the alignment of the mirrors 154a-154c (e.g., without confirmation from the driver). In some embodiments, the processor 106 may perform the automatic adjustment in response to the driver 152 adjusting the orientation of the mirrors 154a-154c automatically and/or based on updated status information (e.g., the driver 152 changed the position of the driver seat). In some embodiments, the automatic adjustment of the mirrors 154a-154c may be initiated in response to a manual activation (e.g., the driver 152 presses a button to initiate the automatic adjustment of the mirrors 154a-154c).

In some embodiments, a direct distance measurement of the driver from the camera lens 112 may be determined using a depth sensing camera system. The camera lens 112 (or camera type) connected to the capture device 102 may be a depth sensing camera configured to implement one or more of various depth sensing camera technologies. For example, the depth sensing camera technology implemented may be time-of-flight. In another example, the depth sensing camera technology implemented may be stereo triangulation. In yet another example, the depth sensing camera technology implemented may be sheet of light triangulation, structured light, interferometry and/or coded aperture. In some embodiments more than one camera lens 112 may be implemented. The type, number of cameras, camera lenses 112 and/or depth sensing technologies implemented may be varied according to the design criteria of a particular implementation.

Based on the location of the eyes in the video frame and the distance of the eyes from the camera lens 112, an estimate of the position of the eyes (e.g., in 3D space) relative to the mirrors 154a-154c may be determined. Based on the position of the eyes relative to the mirrors 154a-154c, the corresponding FOVs 202a-202c of the driver 152 for each eye in each mirror may be determined. The camera system 100 may then determine possible FOVs 202a-202c for each eye for possible mirror orientations.

The processor 106 may be configured to determine an orientation of the mirrors 154a-154c based on the possible mirror orientations and/or possible FOVs 202a-202c. For example, the processor 106 may determine a FOV that reduces and/or eliminates blind spots and/or blind zones based on geometry of the mirrors 154a-154c and/or specifications of the vehicle 50. The signal CONTROL may be generated by the processor 106 to provide automatic adjustment of the mirrors.

The functions performed by the diagrams of FIGS. 6-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories) RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a sensor configured to generate a video signal based on a targeted view of a driver;
an interface configured to receive status information about one or more components of a vehicle; and
a processor configured to generate a control signal in response to a determined field of view of said driver, wherein (A) said control signal is used to adjust one or more mirrors of said vehicle, (B) said field of view is determined based on (i) location coordinates for eyes of said driver and (ii) an orientation of said one or more mirrors, (C) said location coordinates for said eyes are determined based on analysis of one or more video frames of said video signal to determine (i) one or more of a first location coordinate and a second location coordinate of said eyes and (ii) a depth coordinate representing a distance of said eyes from said sensor, and (D) said depth coordinate is determined based on a comparison of a reference number of pixels of an object in a reference video frame to a current number of pixels of said object in said video frames.

2. The apparatus according to claim 1, wherein said status information comprises said orientation of said one or more mirrors.

3. The apparatus according to claim 1, wherein said status information comprises a position of a seat of said driver.

4. The apparatus according to claim 3, wherein said position of said seat of said driver comprises a height, depth, recline and an angle of a bottom cushion of said seat.

5. The apparatus according to claim 1, wherein said interface is configured to connect to a communication device.

6. The apparatus according to claim 5, wherein said communication device is at least one of a satellite, an on-board diagnostics port of said vehicle and a cellular system.

7. The apparatus according to claim 1, wherein said sensor is implemented as one of (i) a component of a camera and (ii) a video capturing device.

8. The apparatus according to claim 1, wherein said reference number of pixels for said object is based on an object of known size.

9. The apparatus according to claim 8, wherein said reference number of pixels is determined when said object of known size is at a known distance from said sensor.

10. The apparatus according to claim 1, wherein said control signal is configured to generate a warning.

11. The apparatus according to claim 1, wherein said adjustment is performed based on (i) a manual activation in a first mode, (ii) a pre-determined amount of time in a second mode and (iii) a change of said status information in a third mode.

12. The apparatus according to claim 1, wherein said sensor is configured to implement a depth sensing camera system for determining said depth coordinate.

13. The apparatus according to claim 1, wherein said (i) adjustment of said mirrors is performed automatically and (ii) manual controls for said mirrors are available for manual adjustment of said mirrors.

14. The apparatus according to claim 1, wherein said determined field of view of said driver comprises a number of fields of view, each corresponding to one of a plurality of mirrors of said vehicle.

15. The apparatus according to claim 14, wherein said number of said fields of view is three.

16. The apparatus according to claim 1, further comprising a second processor configured to (i) receive a bitstream generated by said sensor and (ii) transform said bitstream into said video signal of said driver.

17. The apparatus according to claim 1, wherein said video signal comprises a plurality of digital images.

18. An apparatus comprising:
a sensor configured to generate a bitstream based on a targeted view implemented by a video capture device, wherein said targeted view is selected to capture a driver of a vehicle;
a first processor configured to (i) receive said bitstream from said sensor and (ii) generate a video signal based on said bitstream;
an interface configured to receive status information about one or more components of a vehicle; and
a second processor configured to generate a control signal in response to a determined field of view of said driver, wherein (A) said control signal is used to adjust one or more mirrors of said vehicle, (B) said field of view is determined based on (i) location coordinates for eyes of said driver and (ii) an orientation of said one or more mirrors, (C) said location coordinates for said eyes are determined based on analysis of one or more video frames of said video signal to determine (i) one or more of a first location coordinate and a second location coordinate of said eyes and (ii) a depth coordinate representing a distance of said eyes from said sensor, and (D) said depth coordinate is determined based on a comparison of a reference number of pixels of an object in a reference video frame to a current number of pixels of said object in said video frames.

19. The apparatus according to claim 18, wherein said analysis of said video frames from said video signal is performed by (i) said first processor in a first mode and (ii) said second processor in a second mode.

* * * * *